(12) United States Patent
Hashiguchi

(10) Patent No.: US 11,495,027 B2
(45) Date of Patent: Nov. 8, 2022

(54) VEHICLE PERIPHERY MONITORING SYSTEM

(71) Applicant: Mazda Motor Corporation, Hiroshima (JP)

(72) Inventor: Hironobu Hashiguchi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/197,192

(22) Filed: Mar. 10, 2021

(65) Prior Publication Data

US 2021/0365692 A1 Nov. 25, 2021

(30) Foreign Application Priority Data

May 19, 2020 (JP) .............................. JP2020-087614

(51) Int. Cl.
| | |
|---|---|
| *H04N 7/18* | (2006.01) |
| *G06V 20/56* | (2022.01) |
| *B60R 1/00* | (2022.01) |
| *B60R 11/04* | (2006.01) |
| *B64C 39/02* | (2006.01) |
| *B60R 11/00* | (2006.01) |

(52) U.S. Cl.
CPC ................ *G06V 20/56* (2022.01); *B60R 1/00* (2013.01); *B60R 11/04* (2013.01); *B64C 39/022* (2013.01); *B64C 39/024* (2013.01); *B60R 2011/004* (2013.01); *B60R 2300/802* (2013.01); *B60R 2300/8033* (2013.01); *B64C 2201/127* (2013.01); *B64C 2201/148* (2013.01)

(58) Field of Classification Search
CPC ........... G06V 20/56; B60R 1/00; B60R 11/04; B60R 2011/004; B60R 2300/802; B60R 2300/8033; B64C 39/022; B64C 39/024; B64C 2201/148
USPC ......................................................... 348/148
See application file for complete search history.

(56) References Cited

U.S. PATENT DOCUMENTS

2013/0120130 A1* 5/2013 Cha ........................ B60Q 1/323
340/468

FOREIGN PATENT DOCUMENTS

| JP | 2016-138853 A | | 8/2016 |
|---|---|---|---|
| JP | 2016138853 A | * | 8/2016 |
| JP | 2017027396 A | * | 2/2017 |

* cited by examiner

*Primary Examiner* — Masum Billah
(74) *Attorney, Agent, or Firm* — Xsensus LLP

(57) ABSTRACT

Upon detection of boarding of a person in a vehicle compartment of a vehicle by a vehicle information detector, a controller controls an aircraft such that the aircraft takes off from the vehicle, a photographing unit photographs a periphery of the vehicle, and a video captured by the photographing unit is transmitted to a communication unit.

14 Claims, 9 Drawing Sheets

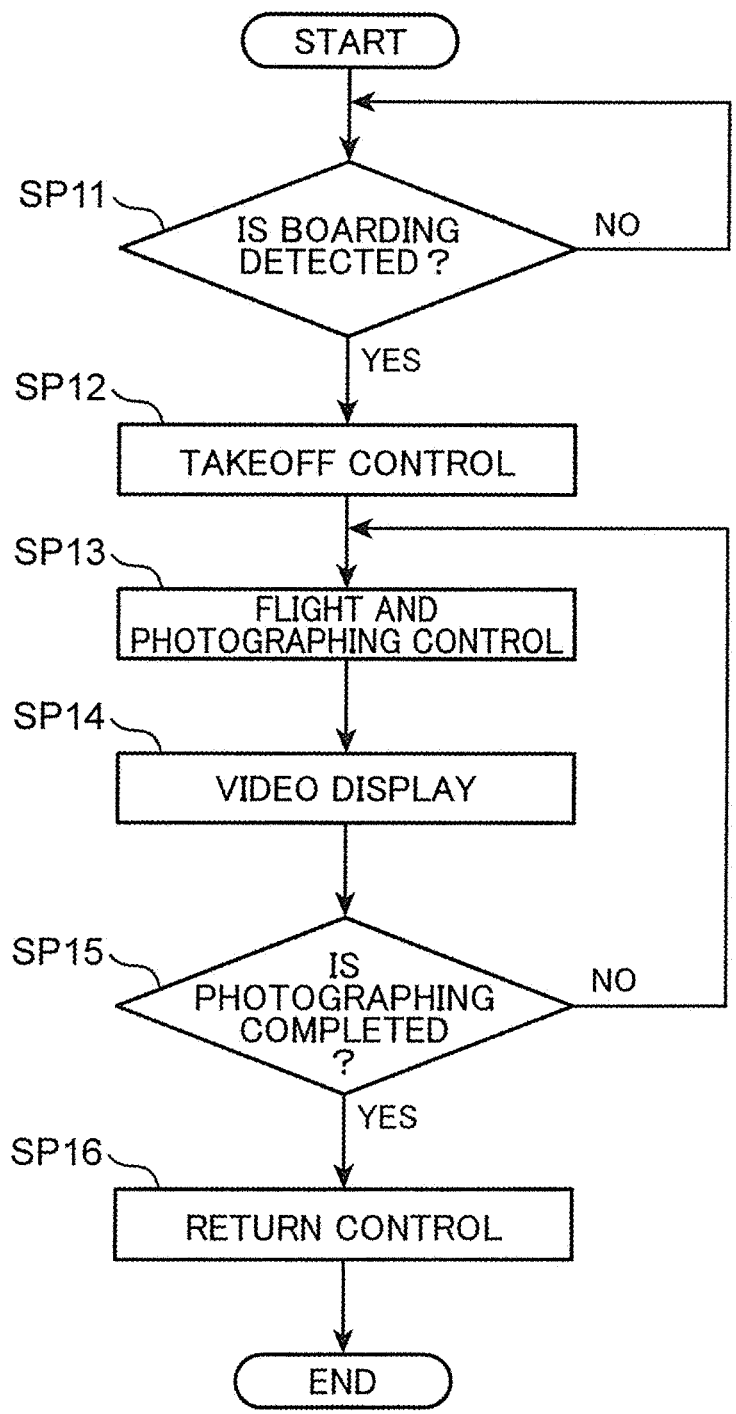

VEHICLE PERIPHERY MONITORING SYSTEM

CROSS-REFERENCE TO RELATED APPLICATION

The present application claims priority to Japanese App. No. 2020-087614, filed May 19, 2020, the entire contents of which being incorporated herein by reference in its entirety.

TECHNICAL FIELD

The present invention relates to a vehicle periphery monitoring system.

BACKGROUND ART

JP 2016-138853 A discloses a navigation system in which an aircraft equipped with a camera is mounted on a vehicle, a captured image is acquired by flying the aircraft above the vehicle by control from a navigation device in the vehicle, and traveling of the vehicle is assisted based on analysis results of the captured image.

When an occupant starts driving a vehicle, the occupant usually boards in a vehicle compartment after confirming safety for obstacles in a periphery of the parked vehicle. However, if an infant, an animal, or the like moves to a blind spot area of the vehicle after the occupant boards in the vehicle compartment, the occupant may start driving the vehicle without noticing presence of the infant, the animal, or the like. It is therefore desired to realize a means for the occupant to ensure safety in the periphery of the vehicle after the occupant boards in the vehicle compartment.

However, the navigation system disclosed in JP 2016-138853 A does not take into consideration that the image captured by the camera of the aircraft is utilized for safety confirmation after the person boards in the vehicle compartment of the parked vehicle to start driving.

SUMMARY OF INVENTION

The present invention has been made in view of such circumstances, and an object of the present invention is to obtain a vehicle periphery monitoring system capable of utilizing an image captured by a photographing unit of an aircraft for safety confirmation after a person boards in a vehicle compartment of a parked vehicle to start driving.

A vehicle periphery monitoring system according to one aspect of the present invention includes an aircraft mounted on a vehicle, having a photographing unit, and configured to fly outside the vehicle, a communication unit provided in the vehicle and configured to receive an image captured by the photographing unit, a display unit configured to display the image received by the communication unit in a vehicle compartment of the vehicle, a controller configured to control the aircraft, and a boarding detector configured to detect boarding of a person in the vehicle compartment of the vehicle being parked, in which upon detection of the boarding of the person in the vehicle compartment by the boarding detector, the controller controls the aircraft to take off from the vehicle, controls the photographing unit to photograph a periphery of the vehicle, and controls an image captured by the photographing unit to be transmitted to the communication unit.

BRIEF DESCRIPTION OF DRAWINGS

FIG. 9 is a flowchart of a control flow of the aircraft by a controller of the vehicle.

DESCRIPTION OF EMBODIMENTS

Figure 1:
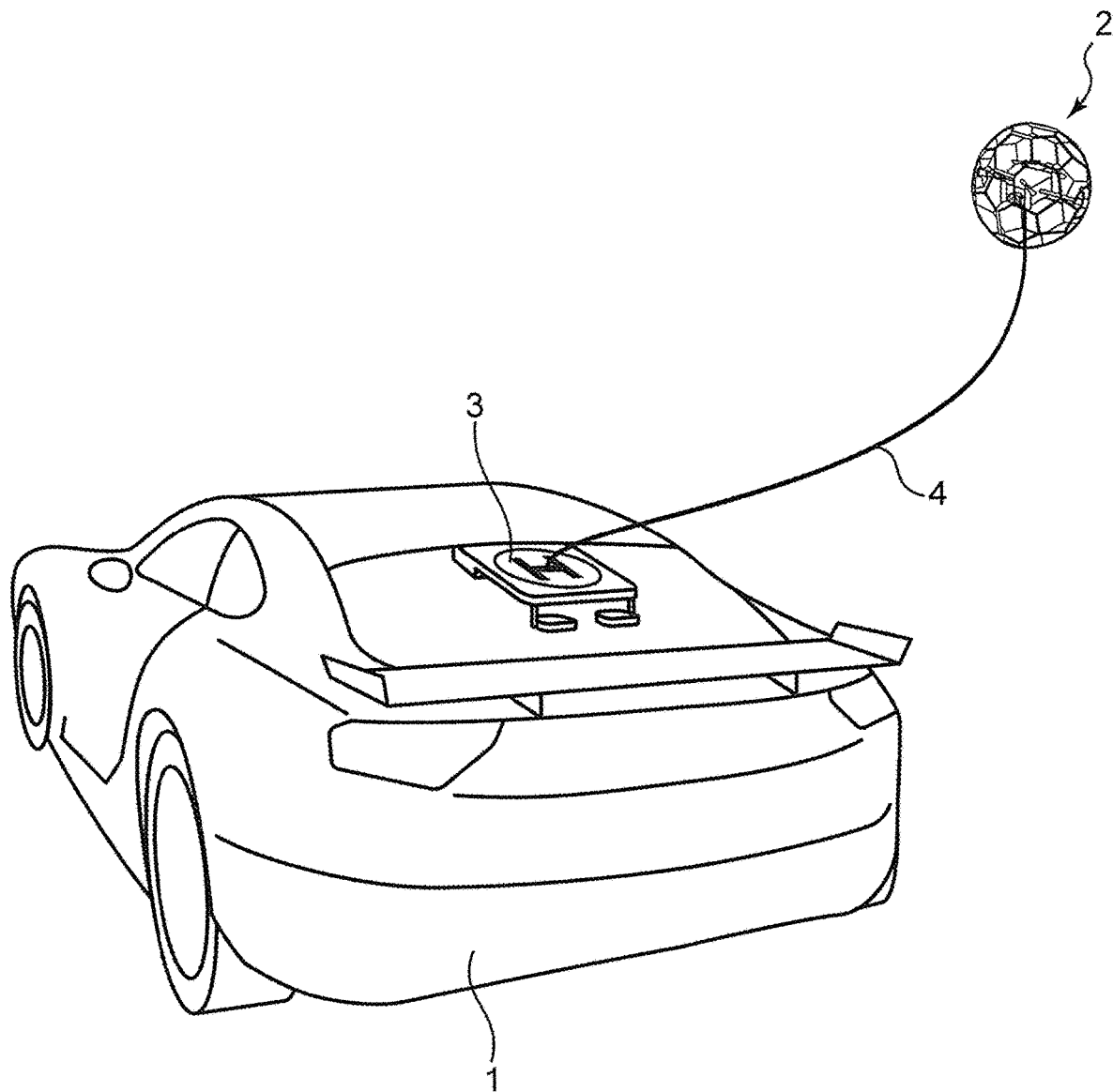
FIG. 1 is a diagram showing an application example of a vehicle periphery monitoring system according to an embodiment of the present invention.

Hereinafter, an embodiment of the present invention will be described in detail with reference to the drawings. The elements with the same reference numerals in different drawings indicate the same or corresponding elements.

FIG. 1 is a diagram showing an application example of a vehicle periphery monitoring system according to the embodiment of the present invention. The vehicle 1 is equipped with an aircraft 2 capable of flying outside the vehicle 1. The landing platform 3 of the aircraft 2 is disposed at a predetermined position (on a rear windshield in this example) of the vehicle 1. The landing platform 3 has a horizontal launching and landing surface for the aircraft 2 to take off and land. A windup reel 19 (not shown in FIG. 1) is disposed below the launching and landing surface. The windup reel 19 has a rotating shaft (not shown) around which a tether 4 as a power feeding cable is wound. A through hole is provided in a substantially center of the launching and landing surface, and the tether 4 wound around the rotating shaft of the windup reel 19 is inserted into the through hole and drawn out above the launching and landing surface to be connected to the aircraft 2.

Figure 2:
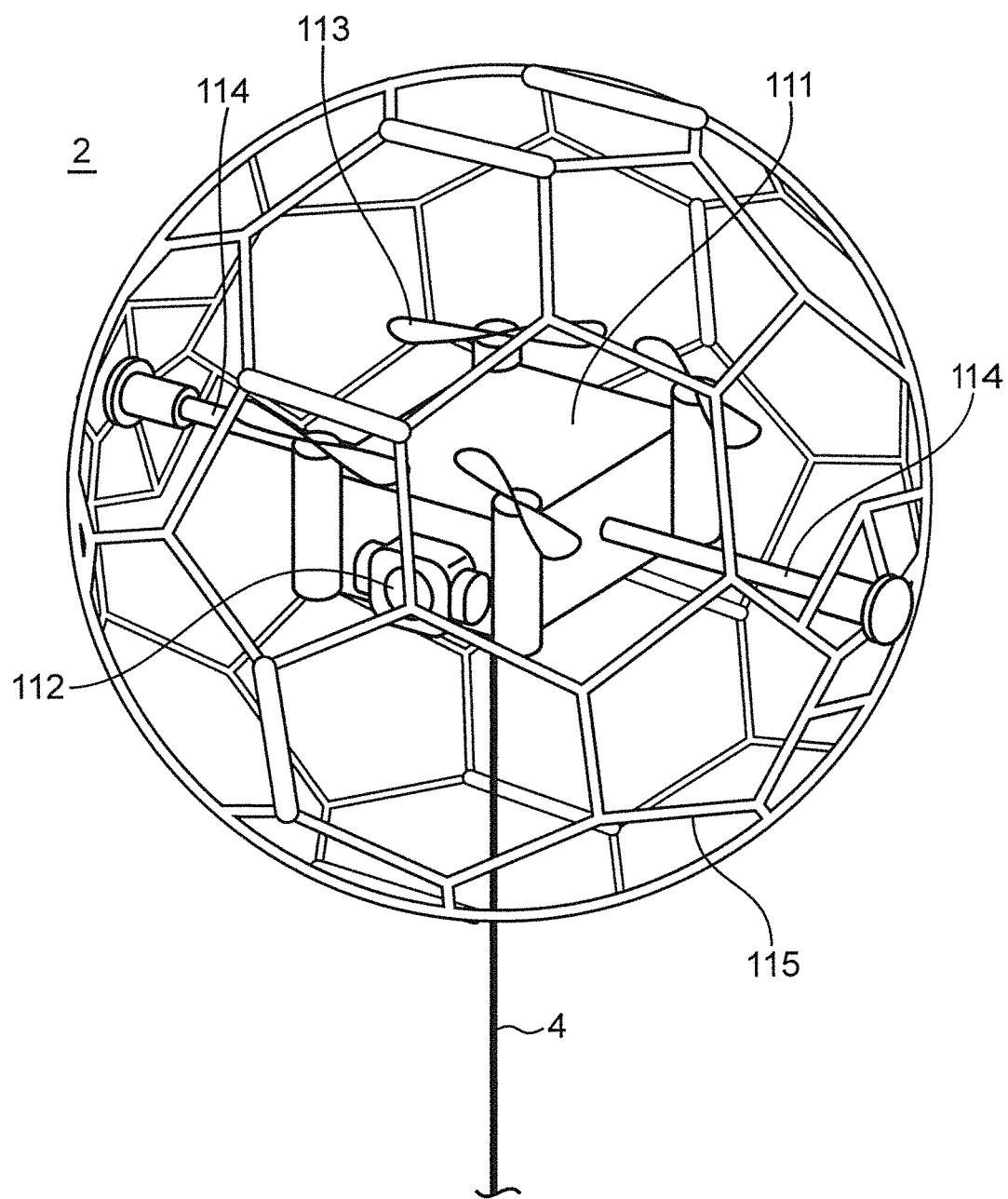
FIG. 2 is a diagram schematically showing appearance of an aircraft.

FIG. 2 is a diagram schematically showing appearance of the aircraft 2. The aircraft 2 is configured as a so-called quadcopter drone. The aircraft 2 includes a body 111, a camera 112 disposed on a front face of the body 111, propellers 113 disposed at four corners of the body 111, a pair of shafts 114 extending orthogonally to both left and right faces of the body 111, and a mesh spherical cushioning member 115 enclosing the body 111. The body 111 and the cushioning member 115 are fixed to each other by the shaft 114. The tether 4 is connected to a bottom face of the body 111.

Figure 3:
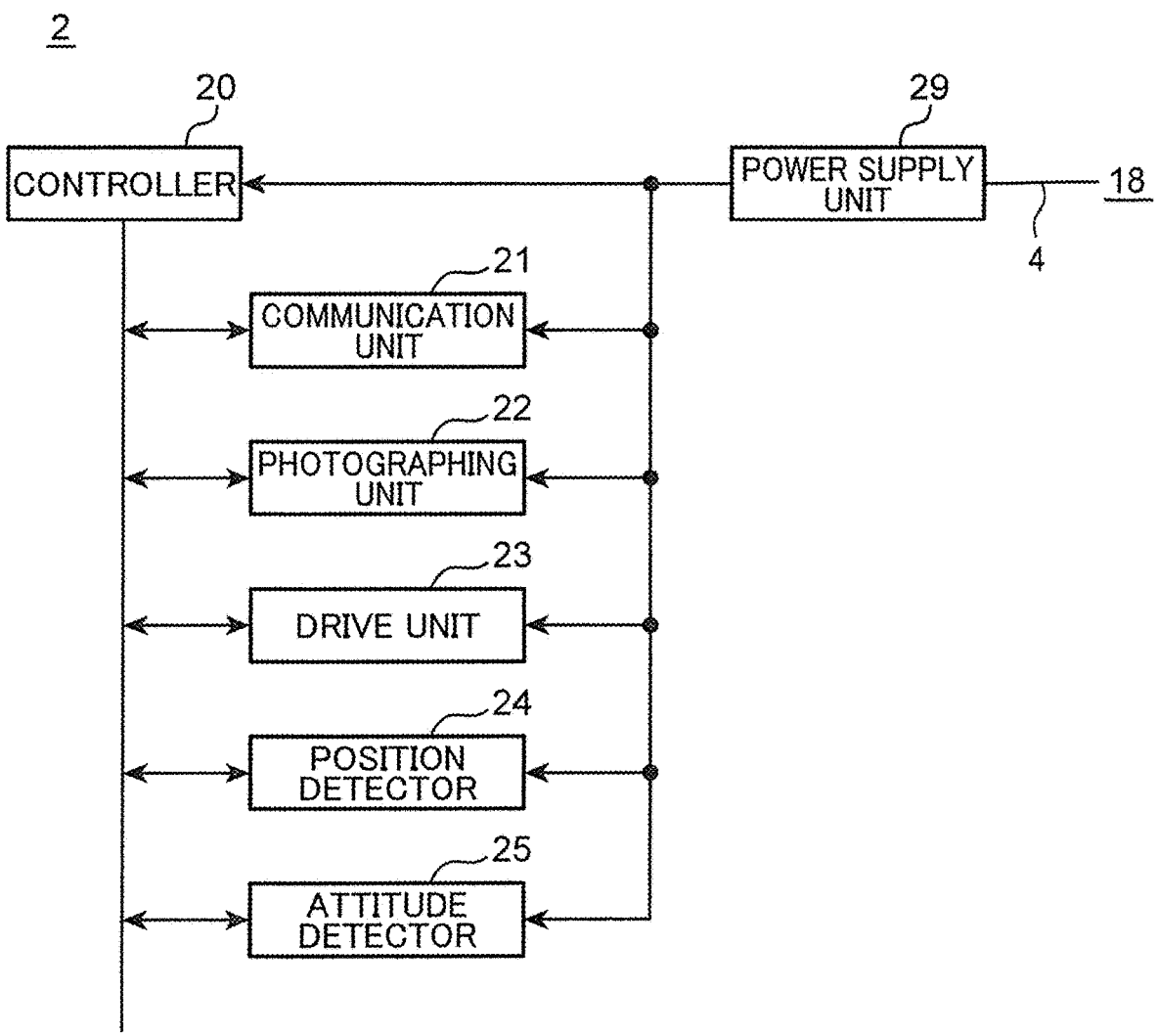
FIG. 3 is a block diagram showing a functional configuration of the aircraft.

FIG. 3 is a block diagram showing a functional configuration of the aircraft 2. As shown in FIG. 3, the aircraft 2 has a communication unit 21, a photographing unit 22, a drive unit 23, a position detector 24, and an attitude detector 25. Further, the aircraft 2 has a controller 20 that administers total control of the aircraft 2 by controlling operations of these processors. Further, the aircraft 2 has a power supply unit 29 that supplies driving power to these processors and the controller 20. The power supply unit 29 is connected to the tether 4. By supplying the driving power of the aircraft 2 from the vehicle 1 via the tether 4, mounting of the battery in the aircraft 2 can be omitted, thereby reducing a weight of the aircraft 2. A total weight of the aircraft 2 is less than a weight limit (for example, 200 grams) subject to flight restrictions.

The communication unit 21 performs bidirectional data communication with the communication unit 122 of the vehicle 1, which will be described later, by a short-range wireless communication system such as Bluetooth (registered trademark). However, by adding a data communication line in the tether 4, the communication unit 21 and the communication unit 122 may be configured to wire communicate with each other via the data communication line.

The photographing unit 22 includes the camera 112 shown in FIG. 2. An image captured by the photographing unit 22 includes both a still image (photograph) and a moving image (video). In the following description, a case where a video is captured by the photographing unit 22 will be exemplified. The photographing unit 22 outputs video data of the video captured by the camera 112 in real time.

The drive unit 23 includes a motor for driving a propeller shaft of the propellers 113 shown in FIG. 2 to rotate. The drive unit 23 individually controls a rotation direction and rotation speed of the four propellers 113. As a result, the aircraft 2 can perform arbitrary flight operations such as forward movement, backward movement, ascent, descent, turning, and hovering.

The position detector 24 includes a GPS receiver, an altitude sensor, and the like, detects a position of the aircraft 2 in real time, and outputs position data indicating the detected position.

The attitude detector 25 includes an acceleration sensor, a gyro sensor, a direction sensor, and the like, and detects an attitude of the aircraft 2 in real time, and outputs attitude data indicating the detected attitude.

The controller 20 transmits the video data output from the photographing unit 22, the position data output from the position detector 24, and the attitude data output from the attitude detector 25 from the communication unit 21 to the vehicle 1 in real time.

Figure 4:
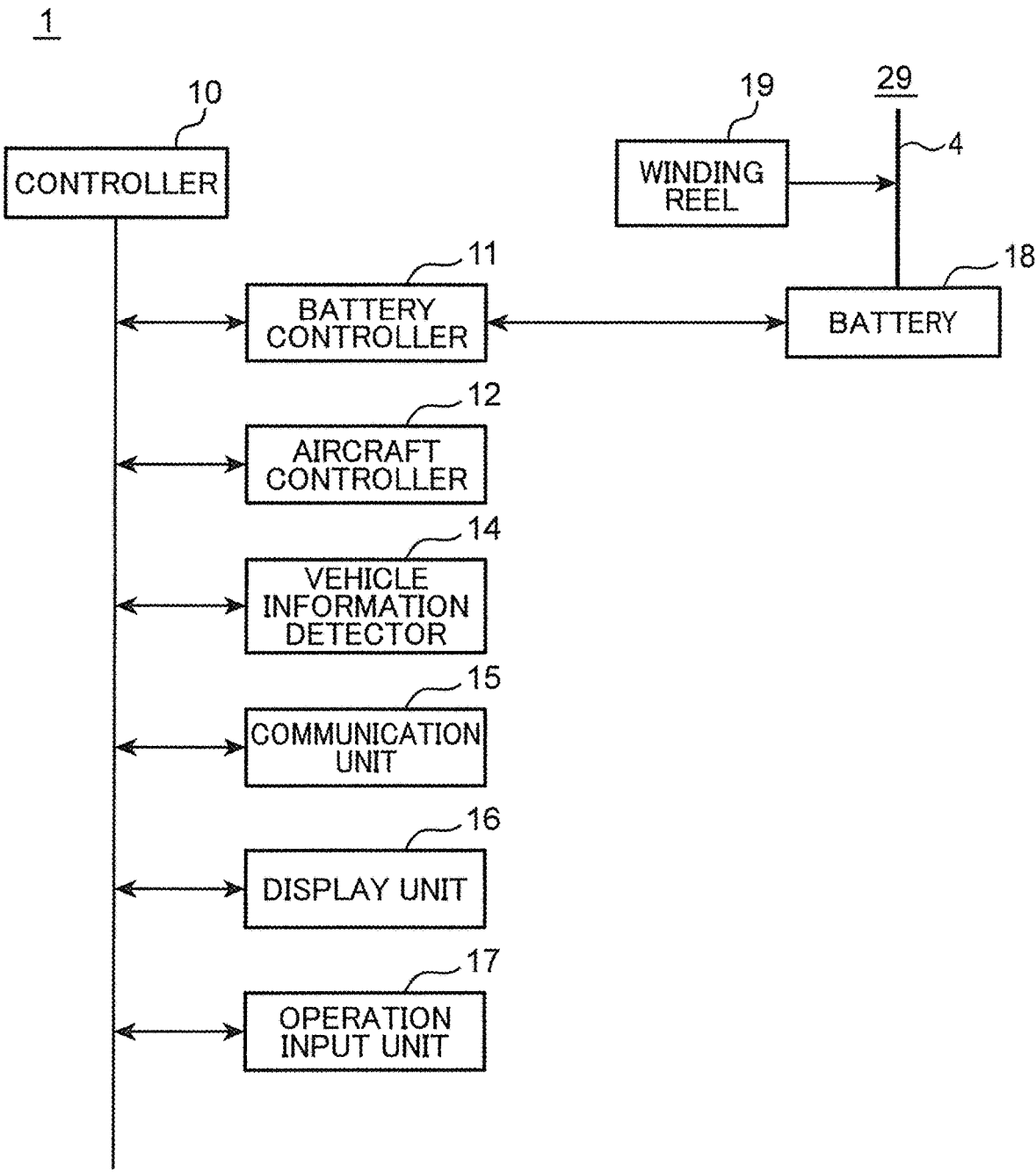
FIG. 4 is a block diagram showing a functional configuration of a vehicle.

FIG. 4 is a block diagram showing a functional configuration of the vehicle 1. As shown in FIG. 4, the vehicle 1 has a battery controller 11, an aircraft controller 12, a vehicle information detector 14, a communication unit 15, a display unit 16, and an operation input unit 17. Further, the vehicle 1 has a controller 10 that administers total control of the vehicle 1 by controlling operations of these processors. Further, the vehicle 1 has a battery 18 that supplies driving power to these processors and the controller 10. The tether 4 is connected to the battery 18. Further, the vehicle 1 has the windup reel 19. The driving power of the windup reel 19 is supplied from the battery 18. The windup reel 19 has the rotating shaft (not shown) around which the tether 4 is wound, and a motor (not shown) for driving the rotating shaft to rotate. The windup reel 19 controls feed and collection of the tether 4 by driving the rotating shaft by the motor such that an appropriate amount of the tether 4 according to a flight condition of the aircraft 2 is fed from the rotating shaft.

The battery controller 11 controls charging and discharging operations of the battery 18. Further, the battery controller 11 controls start and stop of power supply from the battery 18 to the tether 4.

The aircraft controller 12 controls a flight of the aircraft 2. The aircraft controller 12 will be described later in detail.

The vehicle information detector 14 detects various types of information of the vehicle 1. The vehicle information detector 14 will be described later in detail.

The communication unit 15 performs bidirectional data communication with a mobile terminal of a user registered in advance by any wireless communication system such as Bluetooth (registered trademark) or wireless LAN. The mobile terminal is a smartphone, a tablet, a laptop computer, or the like having a display unit.

The display unit 16 includes an in-vehicle display device using an arbitrary display device such as an LCD or an organic EL. The display unit 16 may be a display included in a car navigation device.

The operation input unit 17 includes a switch that allows manual operation input by a driver or passenger of the vehicle 1. The operation input unit 17 includes, for example, a steering switch, a touch screen of an in-vehicle display, and a touch screen of the mobile terminal of the user.

Figure 5:
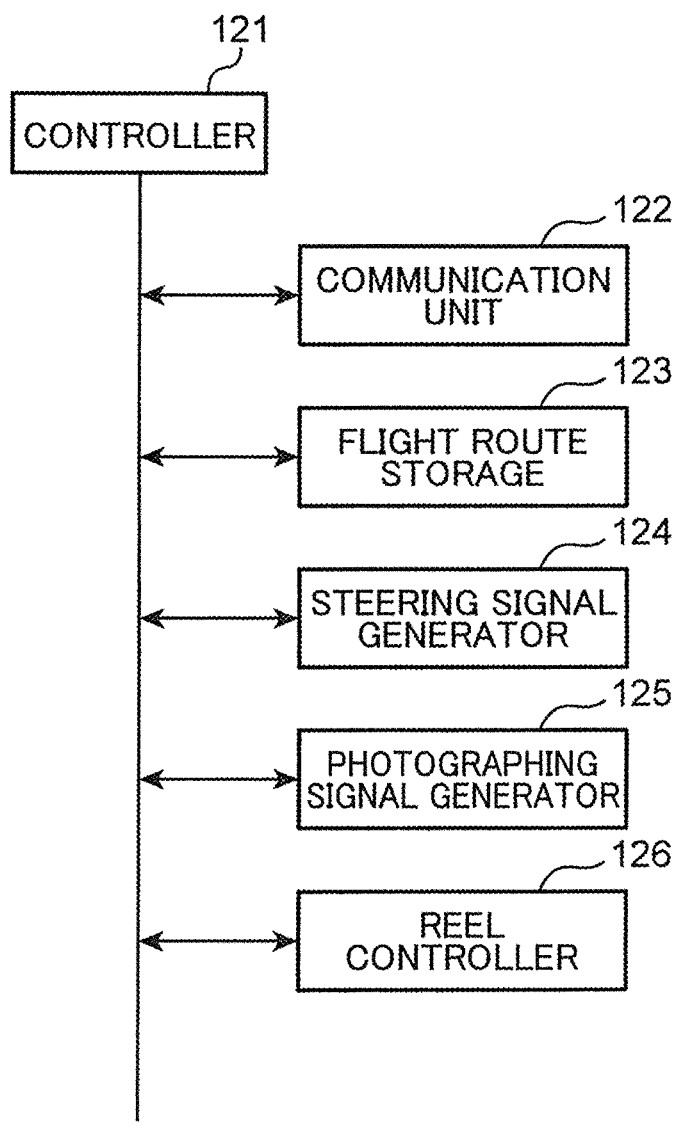
FIG. 5 is a block diagram showing a functional configuration of an aircraft controller.

FIG. 5 is a block diagram showing a functional configuration of the aircraft controller 12. As shown in FIG. 5, the aircraft controller 12 includes the communication unit 122, a flight route storage 123, a steering signal generator 124, a photographing signal generator 125, and a reel controller 126. Further, the aircraft controller 12 has a controller 121 that controls operations of these processors.

The communication unit 122 performs bidirectional data communication with the communication unit 21 of the aircraft 2 described above by a short-range wireless communication system such as Bluetooth (registered trademark). The communication unit 122 receives the video data, the position data, and the attitude data transmitted from the communication unit 21 in the aircraft 2.

Figure 6:
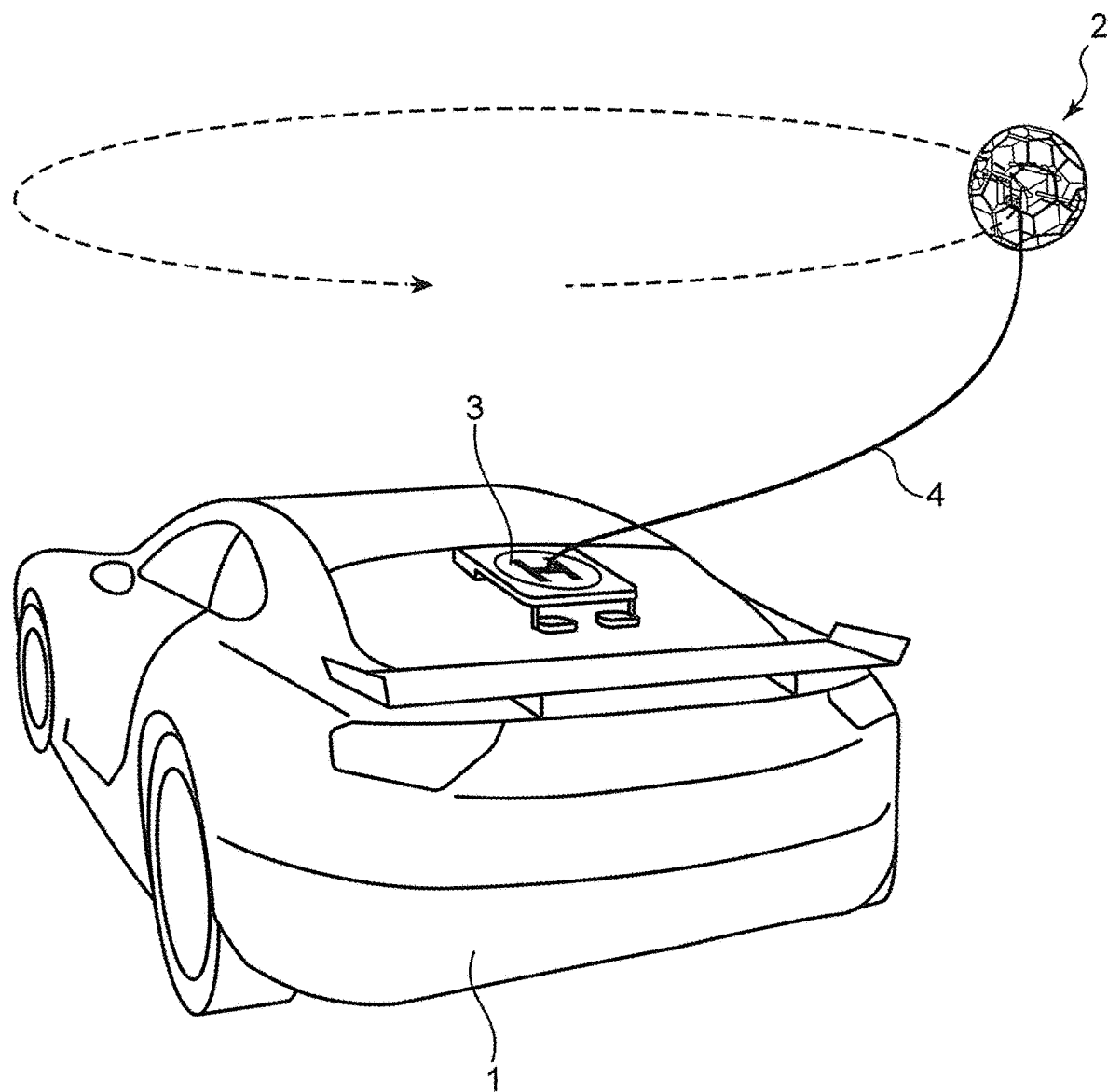
FIG. 6 is a diagram showing an example of a specified flight route of the aircraft.
Figure 7:
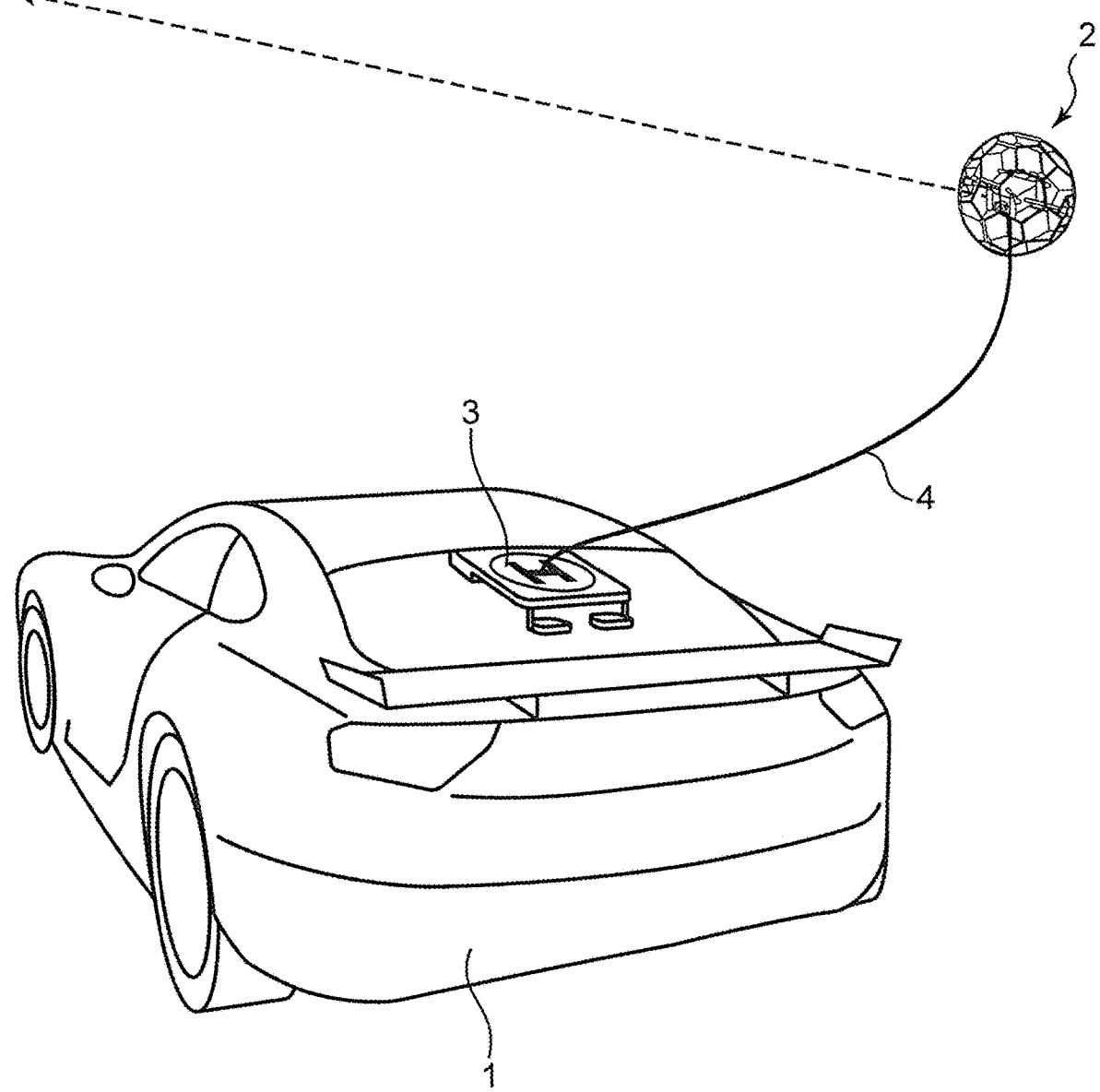
FIG. 7 is a diagram showing an example of the specified flight route of the aircraft.

The flight route storage 123 is configured by using a rewritable non-volatile memory such as a flash memory. A specified flight route of the aircraft 2 with respect to a position of the landing platform 3 is determined in advance, and flight route data indicating the specified flight route is stored in advance in the flight route storage 123. For example, as the specified flight route, the flight route storage 123 stores one of the following routes:

- a turning route in which a predetermined number of laps of turning is made above a periphery of the vehicle 1 (within a predetermined range set in advance, for example, a range of about 5 meters to 10 meters in radius centered on the vehicle 1) (FIG. 6);
- a straight longitudinal route that runs straight over the vehicle 1 from a front to a rear of the vehicle 1;
- a meandering longitudinal route that meanders and runs longitudinally above the vehicle 1 from the front to the rear of the vehicle 1;
- an oblique transverse route that crosses over the vehicle 1 from rear right to front left of the vehicle 1 while skewing (an altitude may change) (FIG. 7); or
- a blind spot photographing route that moves and flies in the periphery of the vehicle such that a blind spot from a visual field of the driver in a vehicle compartment due to a vehicle body shape of the vehicle 1 is included in a photographing range.

However, a plurality of flight routes among these routes may be stored in the flight route storage 123, and a desired flight route among these routes may be selected as the specified flight route by operation input by the user.

The steering signal generator 124 generates a steering signal for flying the aircraft 2 along the specified flight route read from the flight route storage 123 based on the video data, the position data, and the attitude data received by the communication unit 122.

The photographing signal generator 125 generates a photographing start signal for the photographing unit 22 of the aircraft 2 to start photographing and a photographing stop signal for stopping the photographing in accordance with the flight condition of the aircraft 2.

The reel controller 126 controls the windup reel 19. Specifically, the reel controller 126 controls feed and collection of the tether 4 by driving the rotating shaft by the motor such that an appropriate amount of the tether 4 according to the flight condition of the aircraft 2 is fed from the rotating shaft of the windup reel 19.

The controller 121 transmits the steering signal generated by the steering signal generator 124, and the photographing start signal and the photographing stop signal generated by the photographing signal generator 125 from the communication unit 122 to the aircraft 2 in real time.

Figure 8:
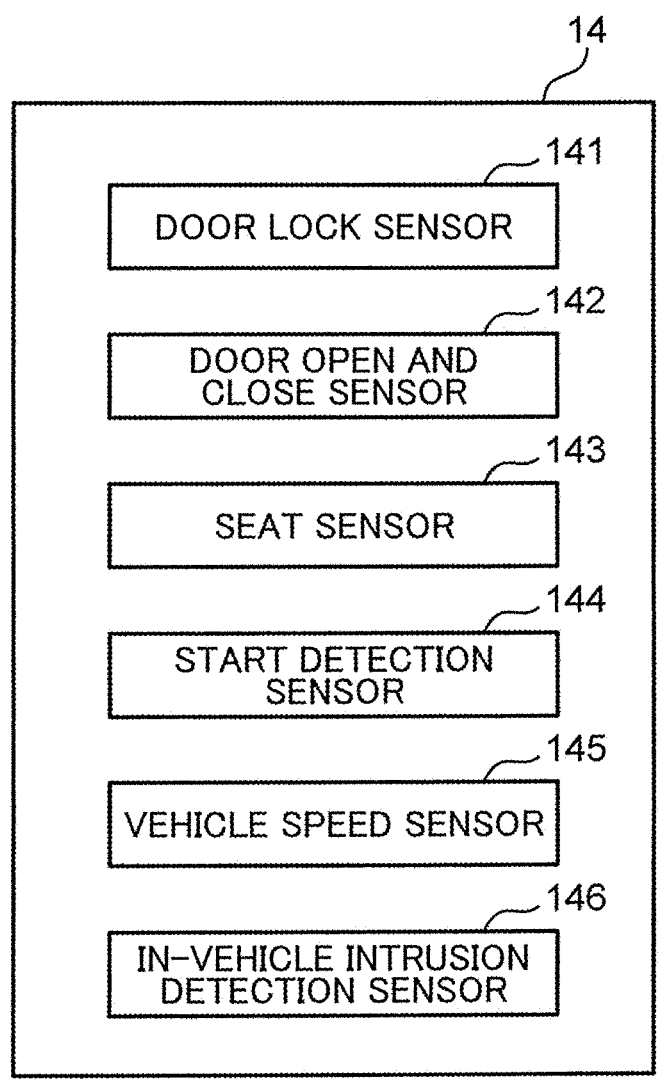
FIG. 8 is a diagram showing a functional configuration of a vehicle information detector.

FIG. 8 is a diagram showing a functional configuration of the vehicle information detector 14. As shown in FIG. 8, the vehicle information detector 14 includes a door lock sensor 141, a door open and close sensor 142, a seat sensor 143, a start detection sensor 144, a vehicle speed sensor 145, and an in-vehicle intrusion detection sensor 146.

The door lock sensor 141 detects a locked state and an unlocked state of doors of the vehicle 1. The door open and close sensor 142 detects an open state and a closed state of the doors of the vehicle 1. The seat sensor 143 detects a seating state of a person on a seat of the vehicle 1. The start detection sensor 144 detects a start state and a stop state of a driving force generation device (engine, travel motor, or the like) of the vehicle 1 by an ignition sensor or by detecting a turned-on state and a turned-off state of a relay switch connecting the battery and a travel motor. The vehicle speed sensor 145 detects vehicle speed of the vehicle 1. The in-vehicle intrusion detection sensor 146 monitors inside of the vehicle 1 which is parked as a monitoring area and detects presence or absence of an intruder in the monitoring area.

FIG. 9 is a flowchart of a control flow of the aircraft 2 by the controller 10 of the vehicle 1. First, in step SP11, the controller 10 detects boarding of a person into the parked vehicle 1 by the vehicle information detector 14. Specifically, the vehicle information detector 14 detects that the vehicle 1 is parked when the start detection sensor 144 detects that the driving force generation device of the vehicle 1 is stopped, the in-vehicle intrusion detection sensor 146 detects that the inside of the vehicle 1 is unattended, and the door lock sensor 141 detects that all the doors of the vehicle 1 are locked. The vehicle information detector 14 detects boarding of a person on the vehicle 1 when at least one of the following events (A) to (D) occurs while the vehicle 1 is parked.

(A) The door lock sensor 141 detects that a driver-side door of the vehicle 1 is unlocked.

(B) The door open and close sensor 142 detects that the driver-side door of the vehicle 1 is opened or closed.

(C) The seat sensor 143 detects that a person is seated in a driver's seat of the vehicle 1.

(D) The start detection sensor 144 detects that the driving force generation device of the vehicle 1 is started.

If the vehicle information detector 14 does not detect boarding (step SP11: NO), the controller 10 repeatedly executes a process of step SP11.

If the vehicle information detector 14 detects boarding (step SP11: YES), then in step SP12, the controller 10 causes the aircraft controller 12 to perform takeoff control of the aircraft 2. Specifically, referring to FIGS. 3 to 5, the battery controller 11 first starts supplying electric power from the battery 18 to the aircraft 2 via the tether 4. Next, the controller 121 reads out data of the specified flight route from the flight route storage 123. Next, the steering signal generator 124 generates the steering signal for flying the aircraft 2 along the specified flight route. Further, the photographing signal generator 125 generates the photographing start signal for causing the photographing unit 22 of the aircraft 2 to start photographing. Next, the communication unit 122 transmits the steering signal and the photographing start signal to the aircraft 2. Next, the communication unit 21 in the aircraft 2 receives the steering signal and the photographing start signal transmitted from the communication unit 122 in the vehicle 1. Next, the drive unit 23 drives the propellers 113 based on the steering signal to start control for flying the aircraft 2 along the specified flight route. As a result, the aircraft 2 takes off from the landing platform 3. Further, the photographing unit 22 starts photographing by the camera 112, the position detector 24 starts position detection of the aircraft 2, and the attitude detector 25 starts attitude detecting of the aircraft 2. The controller 20 transmits the video data output from the photographing unit 22, the position data output from the position detector 24, and the attitude data output from the attitude detector 25 from the communication unit 21 to the vehicle 1 in real time.

Next, in step SP13, the controller 10 causes the aircraft controller 12 to continue flight control and photographing control of the aircraft 2. The steering signal generator 124 generates the steering signal for flying the aircraft 2 along the specified flight route based on the video data, the position data, and the attitude data received by the communication unit 122 from the communication unit 21. Similarly to the above, a flight of the aircraft 2 is controlled by this steering signal transmitted to the aircraft 2.

Next, in step SP14, the controller 10 displays the video captured by the camera 112 on the in-vehicle display by transferring the video data received from the communication unit 21 by the communication unit 122 to the display unit 16. Alternatively, the controller 10 may display the captured video on the display unit of the mobile terminal of the user by transmitting the video data from the communication unit 15 to the mobile terminal.

Next, in step SP15, the controller 10 causes the aircraft controller 12 to analyze a flight trajectory of the aircraft 2 based on the position data received by the communication unit 122, and thereby determines whether the flight and photographing along the specified flight route are completed.

If the flight and photographing along the specified flight route are not completed (step SP15: NO), the controller 10 repeatedly executes processes of steps SP13 to SP15.

When the flight and photographing along the specified flight route are completed (step SP15: YES), the controller 10 then causes the aircraft controller 12 to execute return control of the aircraft 2 in step SP16. Specifically, the steering signal generator 124 generates the steering signal for flying the aircraft 2 toward the landing platform 3 based on the video data, the position data, and the attitude data received by the communication unit 122. Similarly to the above, the flight of the aircraft 2 is controlled by this steering signal transmitted to the aircraft 2, and the aircraft 2 returns to the landing platform 3. Next, the photographing signal generator 125 generates the photographing stop signal for stopping photographing for the photographing unit 22 of the aircraft 2. The photographing stop signal is transmitted to the aircraft 2, and the photographing unit 22 stops photographing by the camera 112. After that, the battery controller 11 stops the power supply from the battery 18 to the aircraft 2.

In the above description, the photographing unit 22 performs photographing from takeoff of the aircraft 2 until return of the aircraft 2. However, the photographing may be performed only while the aircraft 2 is flying in the specified flight route determined in advance.

In the vehicle periphery monitoring system according to the present embodiment, upon detection of boarding of a person on the vehicle 1 by the vehicle information detector 14 (boarding detector), the controller 10 (controller) of the vehicle 1 flies the aircraft 2 from the vehicle 1, causes the photographing unit 22 to photograph the periphery of the vehicle 1, and displays the captured video on the display unit 16. Thus, the video of the periphery of the vehicle 1 (within a predetermined range set in advance, for example, a radius of about 5 meters to 10 meters centered on the vehicle 1) is automatically displayed on the display unit 16 without manual operation input after the person boards in the vehicle compartment of the vehicle 1. It is therefore possible to utilize the video captured by the photographing unit 22 of the aircraft 2 for safety confirmation to start driving after the person boards in the vehicle compartment of the parked vehicle 1.

Further, the controller 10 causes the photographing unit 22 to photograph the periphery of the vehicle 1 from a plurality of directions by moving and flying the aircraft 2 along the specified flight route, and displays the captured videos in the plurality of directions on the display unit 16. Therefore, the driver of the vehicle 1 can accurately grasp a condition of the periphery of the vehicle 1 by confirming the images displayed on the display unit 16 (images captured from a plurality of angles), thereby enhancing an effect of improving the safety confirmation using the videos captured by the aircraft 2.

Further, when the blind spot photographing route is set as the specified flight route of the aircraft 2, the blind spot from the visual field of the driver in the vehicle compartment due to the vehicle body shape of the vehicle 1 is photographed by the photographing unit 22, and the captured video is displayed on the display unit 16. Thus, the driver can accurately grasp a condition of a blind spot area by confirming the video displayed on the display unit 16, thereby further enhancing the effect of improving the safety confirmation using the video captured by the aircraft 2.

Further, upon detection of boarding in the vehicle 1 due to occurrence of the above events (A) to (C), the captured video can be displayed on the display unit 16 at a relatively early stage before the driving force generation device of the vehicle 1 is started. This can further enhance the effect of improving the safety confirmation using the video captured by the aircraft 2.

<First Modification>

In the above embodiment, the blind spot photographing route determined in accordance with the vehicle body shape of the vehicle 1 is stored in advance in the flight route storage 123. However, the blind spot from the visual field of the driver can change depending on a peripheral condition of the parked vehicle 1. For example, if a large vehicle is parked next to the parked vehicle 1 or if there is an obstacle such as a block wall, a new blind spot is caused by presence of the large vehicle, the obstacle, or the like.

Thus, a flight route creator that creates a flight route that includes a new blind spot caused by the peripheral condition of the parked vehicle 1 within the photographing range of the photographing unit 22 may be added as a function of the aircraft controller 12. The flight route creator performs video analysis such as pattern matching on the captured video received from the aircraft 2, and determines whether there is an object in the periphery of the vehicle 1 that can cause a new blind spot. When such an object is present, the flight route creator identifies a new blind spot area based on a shape of the object and a positional relationship between the object and the vehicle 1. The flight route creator creates the flight route of the aircraft 2 such that the new blind spot area is included in the photographing range of the photographing unit 22. The steering signal generator 124 generates the steering signal for flying the aircraft 2 along the flight route.

In this modification, a new blind spot caused by the peripheral condition of the parked vehicle 1 is photographed by the photographing unit 22, and the captured video is displayed on the display unit 16. Thus, the driver can accurately grasp a condition of a blind spot area by confirming the video displayed on the display unit 16, thereby further enhancing the effect of improving the safety confirmation using the video captured by the aircraft 2.

<Second Modification>

In the above embodiment, the aircraft 2 returns to the vehicle 1 upon completion of the photographing along the specified flight route. However, even before the photographing is completed, the controller 10 may immediately return the aircraft 2 to the vehicle 1 when a return command of the aircraft 2 is input from the operation input unit 17 by the user. Specifically, when the return command is input from the operation input unit 17, the controller 10 causes the steering signal generator 124 to generate the steering signal for the aircraft 2 to fly from a current position toward the landing platform 3 based on the video data, the position data, and the attitude data received by the communication unit 122. The flight of the aircraft 2 is controlled by this steering signal transmitted to the aircraft 2, and the aircraft 2 returns to the landing platform 3.

Further, even before the photographing along the specified flight route is completed, the controller 10 may immediately return the aircraft 2 to the vehicle 1 if the vehicle 1 starts traveling. Specifically, when vehicle speed data other than "0" is input from the vehicle speed sensor 145, the controller 10 causes the steering signal generator 124 to generate the steering signal for the aircraft 2 to fly from the current position toward the landing platform 3 based on the video data, the position data, and the attitude data received by the communication unit 122. The flight of the aircraft 2 is controlled by this steering signal transmitted to the aircraft 2, and the aircraft 2 returns to the landing platform 3.

When the aircraft 2 returns before the completion of photographing, the controller 10 may forcibly recover the aircraft 2 by driving the rotating shaft of the windup reel 19 to rotate at high speed by the reel controller 126 instead of causing the steering signal generator 124 to generate the steering signal for returning the aircraft 2. This makes it possible to quickly recover the aircraft 2.

This modification makes it possible to avoid in advance a situation in which the aircraft 2 comes into contact with an obstacle or the like in the periphery after the vehicle 1 starts traveling.

SUMMARY

A vehicle periphery monitoring system according to one aspect of the present invention includes an aircraft mounted on a vehicle, having a photographing unit, and configured to fly outside the vehicle, a communication unit provided in the vehicle and configured to receive an image captured by the photographing unit, a display unit configured to display the image received by the communication unit in a vehicle compartment of the vehicle, a controller configured to control the aircraft, and a boarding detector configured to detect boarding of a person in the vehicle compartment of the vehicle being parked, in which upon detection of the boarding of the person in the vehicle compartment by the boarding detector, the controller controls the aircraft to take off from the vehicle, controls the photographing unit to photograph a periphery of the vehicle, and controls an image captured by the photographing unit to be transmitted to the communication unit.

In this aspect, upon detection of boarding of a person in the vehicle compartment by the boarding detector, the controller controls the aircraft such that the aircraft takes off from the vehicle, the photographing unit photographs the periphery of the vehicle, and the image captured by the photographing unit is transmitted to the communication unit. Thus, the image of the periphery of the vehicle (within a predetermined range set in advance, for example, a radius of about 5 meters to 10 meters centered on the vehicle) is automatically displayed on the display unit without manual operation input after the person boards in the vehicle compartment of the vehicle). It is therefore possible to utilize the image captured by the photographing unit of the aircraft for safety confirmation to start driving after the person boards in the vehicle compartment of the parked vehicle.

In the above aspect, upon detection of the boarding of the person in the vehicle compartment by the boarding detector, the controller desirably controls the aircraft to move and fly in the periphery of the vehicle, controls the photographing unit to photograph the periphery of the vehicle from a plurality of directions, and controls images captured by the photographing unit to be transmitted to the communication unit.

In this aspect, the controller controls the photographing unit to photograph the periphery of the vehicle from a plurality of directions and transmit the image captured by the photographing unit to the communication unit. Therefore, the driver of the vehicle can accurately grasp a condition of the periphery of the vehicle by confirming the images displayed on the display unit (images captured from a plurality of angles), thereby enhancing an effect of improving the safety confirmation using the images captured by the aircraft.

In the above aspect, the vehicle periphery monitoring system desirably further includes a flight route storage configured to store a flight route determined in advance such that a blind spot from a visual field of a driver in the vehicle compartment due to a vehicle body shape of the vehicle is included in a photographing range of the photographing unit, in which the controller desirably controls the aircraft to move and fly in the flight route read from the flight route storage.

In this aspect, the blind spot from the visual field of the driver in the vehicle compartment due to the vehicle body shape of the vehicle is photographed by the photographing unit, and the captured image is displayed on the display unit. Thus, the driver can accurately grasp a condition of a blind spot area by confirming the image displayed on the display unit, thereby further enhancing the effect of improving the safety confirmation using the image captured by the aircraft.

In the above aspect, the vehicle periphery monitoring system desirably further includes a flight route creator configured to create a flight route such that a blind spot from a visual field of a driver in the vehicle compartment due to a peripheral condition of the vehicle being parked is included in a photographing range of the photographing unit, in which the controller desirably controls the aircraft to move and fly in the flight route created by the flight route creator.

In this aspect, the blind spot from the visual field of the driver in the vehicle compartment due to the peripheral condition of the vehicle being parked (a condition of the periphery of a parked vehicle or an obstacle such as a block wall) is photographed by the photographing unit, and the captured image is displayed on the display unit. Thus, the driver can accurately grasp a condition of a blind spot area by confirming the image displayed on the display unit, thereby further enhancing the effect of improving the safety confirmation using the image captured by the aircraft.

In the above aspect, the controller desirably returns the aircraft to the vehicle when the vehicle starts traveling.

In the above aspect, the controller returns the aircraft to the vehicle when the vehicle starts traveling. This makes it possible to avoid in advance a situation in which the aircraft comes into contact with an obstacle or the like in the periphery after the vehicle starts traveling.

In the above aspect, the vehicle periphery monitoring system desirably further includes a winding device that winds a cable, in which the aircraft is connected to the cable, and the controller desirably causes the winding device to wind the cable for the aircraft to return to the vehicle.

In this aspect, the controller causes the winding device to wind the cable when returning the aircraft to the vehicle. This makes it possible to quickly recover the aircraft.

This application is based on Japanese Patent application No. 2020-087614 filed in Japan Patent Office on May 19, 2020, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle periphery monitoring system comprising:
   an aircraft mounted on a vehicle, having a camera, and the aircraft configured to fly outside the vehicle;
   a communicator provided in the vehicle and configured to receive an image captured by the camera;
   a display configured to display the image received by the communicator in a vehicle compartment of the vehicle;
   a controller configured to control the aircraft; and
   boarding detection circuitry configured to detect boarding of a person in the vehicle compartment of the vehicle being parked,
   wherein upon detection of the boarding of the person in the vehicle compartment by the boarding detection circuitry, the controller controls the aircraft to take off from the vehicle, controls the camera to photograph a periphery of the vehicle, and controls an image captured by the camera to be transmitted to the communicator.

2. The vehicle periphery monitoring system according to claim 1, wherein upon detection of the boarding of the person in the vehicle compartment by the boarding detection circuitry, the controller controls the aircraft to move and fly in the periphery of the vehicle, controls the camera to photograph the periphery of the vehicle from a plurality of directions, and controls images captured by the camera to be transmitted to the communicator.

3. The vehicle periphery monitoring system according to claim 2, further comprising a flight route storage configured to store a flight route determined in advance such that a blind spot from a visual field of a driver in the vehicle compartment due to a vehicle body shape of the vehicle is included in a photographing range of the camera,
   wherein the controller controls the aircraft to move and fly in the flight route read from the flight route storage.

4. The vehicle periphery monitoring system according to claim 2, further comprising flight route circuitry configured to create a flight route such that a blind spot from a visual field of a driver in the vehicle compartment due to a peripheral condition of the vehicle being parked is included in a photographing range of the camera,
    wherein the controller controls the aircraft to move and fly in the flight route created by the flight route circuitry.

5. The vehicle periphery monitoring system according to claim 3, wherein the controller returns the aircraft to the vehicle when the vehicle starts traveling.

6. The vehicle periphery monitoring system according to claim 5, further comprising a winding device that winds a cable,
    wherein the aircraft is connected to the cable, and
    the controller causes the winding device to wind the cable for the aircraft to return to the vehicle.

7. The vehicle periphery monitoring system according to claim 1, wherein the controller returns the aircraft to the vehicle when the vehicle starts traveling.

8. The vehicle periphery monitoring system according to claim 2, wherein the controller returns the aircraft to the vehicle when the vehicle starts traveling.

9. The vehicle periphery monitoring system according to claim 4, wherein the controller returns the aircraft to the vehicle when the vehicle starts traveling.

10. The vehicle periphery monitoring system according to claim 7, further comprising a winding device that winds a cable,
    wherein the aircraft is connected to the cable, and
    the controller causes the winding device to wind the cable for the aircraft to return to the vehicle.

11. The vehicle periphery monitoring system according to claim 8, further comprising a winding device that winds a cable,
    wherein the aircraft is connected to the cable, and
    the controller causes the winding device to wind the cable for the aircraft to return to the vehicle.

12. The vehicle periphery monitoring system according to claim 9, further comprising a winding device that winds a cable,
    wherein the aircraft is connected to the cable, and
    the controller causes the winding device to wind the cable for the aircraft to return to the vehicle.

13. The vehicle periphery monitoring system according to claim 4, wherein
    the flight route circuitry
    determines whether an object to cause a new blind spot exists in a periphery of the vehicle by analyzing an image received from the aircraft,
    identifies a new blind spot area based on a shape of the object and a positional relationship between the object and the vehicle upon determination that the object exists, and
    creates the flight route such that the new blind spot area is included in the photographing range of the camera.

14. The vehicle periphery monitoring system according to claim 9, wherein
    the flight route circuitry
    determines whether an object to cause a new blind spot exists in a periphery of the vehicle by analyzing an image received from the aircraft,
    identifies a new blind spot area based on a shape of the object and a positional relationship between the object and the vehicle upon determination that the object exists, and
    creates the flight route such that the new blind spot area is included in the photographing range of the camera.

\* \* \* \* \*